United States Patent
Mainwaring et al.

(10) Patent No.: US 11,490,617 B2
(45) Date of Patent: Nov. 8, 2022

(54) METHODS TO ENHANCE SOIL WATER INFILTRATION AND TO REDUCE SOIL WATER REPELLENCY USING A SURFACTANT COMPOSITION

(71) Applicant: BASF SE, Ludwigshafen am Rhein (DE)

(72) Inventors: David Edward Mainwaring, Hawthorn (AU); Pandiyan Murugaraj, Hawthorn (AU); Rohan Davies, Melbourne (AU); Paul Klingelhoefer, Ludwigshafen (DE); Alexander Wissemeier, Limburgerhof (DE)

(73) Assignee: BASF SE, Ludwigshafen (DE)

( * ) Notice: Subject to any disclaimer, the term of this patent is extended or adjusted under 35 U.S.C. 154(b) by 273 days.

(21) Appl. No.: 16/482,930

(22) PCT Filed: Feb. 2, 2018

(86) PCT No.: PCT/EP2018/052676
§ 371 (c)(1),
(2) Date: Aug. 1, 2019

(87) PCT Pub. No.: WO2018/141913
PCT Pub. Date: Aug. 9, 2018

(65) Prior Publication Data
US 2020/0002609 A1   Jan. 2, 2020

(30) Foreign Application Priority Data

Feb. 3, 2017 (EP) .................................. 17154652
Feb. 13, 2017 (EP) .................................. 17155766

(51) Int. Cl.
| | | |
|---|---|---|
| *A01N 25/30* | (2006.01) | |
| *C08G 65/14* | (2006.01) | |
| *C08G 81/02* | (2006.01) | |
| *C09K 17/18* | (2006.01) | |
| *C11D 1/72* | (2006.01) | |
| *C11D 1/722* | (2006.01) | |
| *C05G 3/70* | (2020.01) | |
| *C05G 3/80* | (2020.01) | |
| *C05G 3/50* | (2020.01) | |
| *C09K 101/00* | (2006.01) | |

(52) U.S. Cl.
CPC .............. *A01N 25/30* (2013.01); *C05G 3/50* (2020.02); *C05G 3/70* (2020.02); *C05G 3/80* (2020.02); *C08G 65/14* (2013.01); *C08G 81/025* (2013.01); *C09K 17/18* (2013.01); *C11D 1/72* (2013.01); *C11D 1/722* (2013.01); *C09K 2101/00* (2013.01)

(58) Field of Classification Search
CPC ........ C05G 3/80; C08G 65/14; C08G 81/025; C09K 17/18; C09K 2101/00; C11D 1/72; C11D 1/722
See application file for complete search history.

(56) References Cited

U.S. PATENT DOCUMENTS

| | | | |
|---|---|---|---|
| 5,608,118 A * | 3/1997 | Dahlgren | ................ C07C 43/11 568/625 |
| 7,723,268 B2 | 5/2010 | Baur et al. | |
| 2002/0042346 A1 | 4/2002 | Hamersky et al. | |
| 2005/0170968 A1 | 8/2005 | Berghaus et al. | |
| 2008/0172937 A1 | 7/2008 | Palmer et al. | |
| 2011/0176872 A1 | 7/2011 | Bially | |
| 2015/0045225 A1 | 2/2015 | Stock et al. | |
| 2016/0075944 A1 | 3/2016 | Blease et al. | |
| 2016/0208128 A1 * | 7/2016 | Kehrloesser | ......... C09D 125/14 |

FOREIGN PATENT DOCUMENTS

| | | | |
|---|---|---|---|
| CN | 102438439 A | 5/2012 | |
| CN | 103391715 A | 11/2013 | |
| JP | 2000-143720 A | 5/2000 | |
| JP | 2015-054880 A | 3/2015 | |
| JP | 5937553 B2 * | 6/2016 | ............. C09K 17/18 |
| WO | WO-2003/022956 A1 | 3/2003 | |
| WO | WO-2013/098573 A1 | 7/2013 | |
| WO | WO-2013/181240 A2 | 12/2013 | |

OTHER PUBLICATIONS

JP 2015054880 A English language translation obtained from Espacenet and EAST.*
STIC oral translation for JP 5937553 B claim 1.*
JP 2015054880 A Abstract English language translation obtained from EAST.*
Davies, et al., "Developing and assessing agronomic strategies for water repellent soils", Crop Updates, vol. 2012, Feb. 20, 2012, 7 pages.
European Search Report for EP Application No. 17154652.6, dated Mar. 30, 2017, 3 pages.
International Search Report and Written Opinion for PCT Patent Application No. PCT/EP2018/052676, dated Mar. 27, 2018.

* cited by examiner

*Primary Examiner* — Mina Haghighatian
*Assistant Examiner* — Nathan W Schlientz
(74) *Attorney, Agent, or Firm* — Marshall, Gerstein & Borun LLP

(57) ABSTRACT

A method of enhancing soil water infiltration (SWI) and/or reducing soil water repellency (SWR) comprising:
  treating an area of groundcover with a composition A comprising
    A1) a block polymer (P) comprising at least one polyethyleneoxide moiety and at least one polypropyleneoxide moiety, and
    A2) an alcohol alkoxylate (E),
    wherein the SWI of the area of groundcover is enhanced and/or the SWR of the area of groundcover is reduced after treatment with the composition A.

3 Claims, No Drawings

METHODS TO ENHANCE SOIL WATER INFILTRATION AND TO REDUCE SOIL WATER REPELLENCY USING A SURFACTANT COMPOSITION

This application is a National Stage application of International Application No. PCT/EP2018/052676, filed Feb. 2, 2018. This application also claims priority under 35 U.S.C. § 119 to European Patent Application No. 17154652.6, filed Feb. 3, 2017, and European Patent Application No. 17155766.3, filed Feb. 13, 2017.

The present invention relates to methods and compositions to enhance soil water infiltration and to reduce soil water repellency.

Soil water repellency (SWR) is a condition where soil does not spontaneously wet when a drop of water is applied to the surface, i.e. the soil is too hydrophobic. Hydrophobic soils occur in many countries on various lands, such as agricultural, pasture, coastal dune sands, forest, shrub lands, parks, turfgrass soils, no-till agriculture, and soils irrigated with treated wastewater. A substantial interest in SWR soils has grown in recent times (see WO 2013/181240 and literature cited therein).

SWR can cause undesirable consequences such as environmental deterioration and considerable losses in crop production. SWR becomes especially problematic on water relationships and can cause associated environmental issues, such as, but not limited to, reduction in soil water intake, uneven wetting patterns, reduced irrigation efficiency and effective precipitation, increased preferential flow that can have adverse effects on aquifer contamination, greater runoff and erosion, limited seed and vegetative establishment, and reduced plant growth and quality. On sandy turfgrass soils and grasslands, SWR is a reoccurring problem called "localized dry spot" (LDS). In LDS, SWR appears as irregular dry areas from a few centimeters to several meters diameter with the repellency usually extending from the surface to 5-10 cm depth. A second SWR situation on turfgrass sites that can appear on all soil types occurs within the dry area of basidiomycete induced "fairy-ring".

The primary cause of SWR is formation of a coating of hydrophobic, organic material on soil particles. This hydrophobic organic material can include surface waxes, fatty acids, and other organics such as lignin, a recalcitrant polymer of phenols. These materials come from plant leaves and other decomposing organic matter, plant root exudates, fungal hyphae/exudates, and volatized organic materials condensing on soil particles following forest or grassland fires. Sandy soils are especially susceptible to SWR due to lower particle surface area. Once sands become coated by organics and upon drying to a critical moisture level, they exhibit a hydrophobic nature and, thereafter, resist rewetting. The conventional remediation practice involves the use of wetting agents (surfactants). It is known in the art that single surfactants can improve soil water infiltration (SWI) and reduce SWR. When used on specific soils, the effect of single surfactants on improving SWI and reducing SWR can be very limited (see: Davies, S., Blackwell, P., Bakker, D., Scanlan, C., Roper, M., Ward, P. (2012) Developing and assessing agronomic strategies for water repellent soils. Crop Updates 2012, p. 358-p. 362).

Soil water infiltration or substrate water infiltration is the process of water infiltration into the soil or a substrate as e.g. a potting mix after application of water or an aqueous solution to the soil/substrate surface (e.g. by natural precipitation, irrigation, fertigation, spray application) and therefore the visual disappearance of water or the aqueous solution from surface. Soil/Substrate water infiltration may be fast or slow, and may differ in the depth the water or solution is reaching in a given period of time. Water holding capacity is defined as the amount of water which a given amount of soil or substrate can retain and store against gravitation.

Therefore, it was an object of the present invention to provide a surfactant composition which can be used for improving SWI and reducing SWR on a broad variety of soils. Additionally, it was an object of the present invention to provide a surfactant composition which can be easily and safely packaged, transported and shipped, even in large quantities, and which can be easily and safely handled and applied for soil treatment, even in large quantities.

In view of the above objects, the present invention relates to a method of enhancing soil water infiltration (SWI) and/or reducing soil water repellency (SWR) comprising:

treating an area of groundcover with a composition (composition A) comprising
A1) a block polymer (P) comprising at least one polyethyleneoxide moiety and at least one polypropyleneoxide moiety, and
A2) an alcohol alkoxylate (E),
wherein the SWI of the area of groundcover is enhanced and/or the SWR of the area of groundcover is reduced after treatment with the composition A.

Furthermore, the present invention also relates to the use of a composition (composition A) comprising
A1) a block polymer (P) comprising at least one polyethyleneoxide moiety and at least one polypropyleneoxide moiety, and
A2) an alcohol alkoxylate (E),
for enhancing soil water infiltration (SWI) and/or reducing soil water repellency (SWR).

In view of the above objects, the present invention furthermore relates to a method of enhancing soil water infiltration (SWI) and/or reducing soil water repellency (SWR) comprising:

treating an area of groundcover with a composition (composition B) comprising
B1) an alcohol ethoxylate (L) of the general formula (III)

$$R^3\text{—}O\text{—}(C_2H_4O)_s\text{—}H \qquad (III)$$

wherein $R^3$ is branched $C_8$ to $C_{20}$ alkyl, and
s has a value of from 1 to 40
and
B2) an alcohol alkoxylate (E),
wherein the SWI of the area of groundcover is enhanced and/or the SWR of the area of groundcover is reduced after treatment with the composition B.

Furthermore, the present invention also relates to the use of the composition (composition B) comprising
B1) an alcohol ethoxylate (L) of the general formula (III)

$$R^3\text{—}O\text{—}(C_2H_4O)_s\text{—}H \qquad (III)$$

wherein $R^3$ is branched $C_8$ to $C_{20}$ alkyl, and
s has a value of from 1 to 40
and
B2) an alcohol alkoxylate (E),
for enhancing soil water infiltration (SWI) and/or reducing soil water repellency (SWR).

The abbreviation wt.-% or wt.-% stands for "percent by weight".

Enhanced SWI means that the SWI measured in case composition A or composition B has not been applied is lower—preferably 4% lower, most preferably 7% lower, particularly 10% lower, particularly preferably 15% lower, particularly most preferably 20% lower, for example 25% lower—than the SWI measured in case composition A or composition B has been applied.

Reduced SWR means that the SWR measured in case composition A or composition B has not been applied is higher—preferably 4% higher, most preferably 7% higher, particularly 10% higher, particularly preferably 15% higher, particularly most preferably 20% higher, for example 25% higher—than the SWR measured in case composition A or composition B has been applied.

"Treating" includes but is not limited to applying, especially applying to the surface of the area of groundcover, spraying, dripping together with irrigation, applying as in-furrow irrigation, applying during or together with irrigation or fertigation. "Treating" includes but is not limited to mixing into the soil, mixing to the potting mix e.g. during its production.

The term "groundcover" includes, but is not limited to, soil, natural soil, potting soil, sand, silt, clay, turfgrasses and other plants and forms of vegetation used to cover and protect the soil, as well as composites of organic materials that form within or as part of such groundcovers, such as thatch and mat layers, and also includes potting mixes. Preferably, groundcover is soil, more preferably, groundcover is water-repellent soil. In another preferred embodiment, groundcover is potting mix. Potting mix, which is also referred to potting soil, is a soilless blend of ingredients that is used to grow plants, preferably, the potting mix comprises a combination of peat moss, vermiculite, coir fiber, perlite, pine bark, sand, compost, and further ingredients.

According to the present invention, the block polymer (P) is contained in the composition A.

The block polymer (P) is preferably a di-, tri-, tetra- and/or pentablock polymer, more preferably a tri- and/or pentablock polymer.

The block polymer (P) is preferably a triblock polymer comprising one polyethyleneoxide moiety and two polypropyleneoxide moieties, or two polyethyleneoxide moieties and one polypropyleneoxide moiety.

In another preferred embodiment, the block polymer (P) is a pentablock polymer comprising two polyethyleneoxide moieties and three polypropyleneoxide moieties, or three polyethyleneoxide moieties and two polypropyleneoxide moieties.

In another preferred embodiment, the block polymer (P) comprises

A1.1) a (EO-PO-EO) triblock polymer of the general formula (Q1)

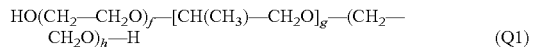

$$HO(CH_2-CH_2O)_f-[CH(CH_3)-CH_2O]_g-(CH_2-CH_2O)_h-H \quad (Q1)$$

wherein f, g and h may denote the degree of polymerization and thus determine the molecular weight, and/or A1.2) a (EO-PO-EO-PO-EO) pentablock polymer of the general formula (Q2)

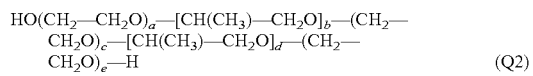

$$HO(CH_2-CH_2O)_a-[CH(CH_3)-CH_2O]_b-(CH_2-CH_2O)_c-[CH(CH_3)-CH_2O]_d-(CH_2-CH_2O)_e-H \quad (Q2)$$

wherein a, b, c, d and e may denote the degree of polymerization and thus determine the molecular weight.

In case of the (EO-PO-EO) triblock polymer of the general formula (Q1), f is preferably from 1 to 100, more preferably from 2 to 50, most preferably from 3 to 30, particularly from 4 to 20, for example from 5 to 12, g is preferably from 1 to 100, more preferably from 5 to 90, most preferably from 10 to 80, particularly from 15 to 70, for example from 25 to 50, h is preferably from 1 to 100, more preferably from 2 to 50, most preferably from 3 to 30, particularly from 4 to 20, for example from 5 to 12.

In case of the (EO-PO-EO-PO-EO) pentablock polymer of the general formula (Q2), a is preferably from 1 to 100, more preferably from 2 to 50, most preferably from 3 to 30, particularly from 4 to 20, for example from 5 to 12, b is preferably from 1 to 100, more preferably from 3 to 50, most preferably from 5 to 40, particularly from 7 to 30, for example from 8 to 20, c is preferably from 1 to 100, more preferably from 1 to 50, most preferably from 1 to 30, particularly from 1 to 20, particularly more preferably from 1 to 10, particularly most preferably from 1 to 6, for example from 1 to 3, d is preferably from 1 to 100, more preferably from 3 to 50, most preferably from 5 to 40, particularly from 7 to 30, for example from 8 to 20, e is preferably from 1 to 100, more preferably from 2 to 50, most preferably from 3 to 30, particularly from 4 to 20, for example from 5 to 12.

In another preferred embodiment, the block polymer (P) comprises a (EO-PO-EO) triblock polymer of the general formula (Q1) and a (EO-PO-EO-PO-EO) pentablock polymer of the general formula (Q2). The molar ratio of the (EO-PO-EO) triblock polymer of the general formula (Q1) and of the (EO-PO-EO-PO-EO) pentablock polymer of the general formula (Q2) is preferably from (triblock:pentablock) 100:1 to 1:100, more preferably from 20:1 to 1:20, most preferably from 10:1 to 1:15, particularly preferably from 5:1 to 1:10, particularly more preferably from 3:1 to 1:7, for example from 1:1 to 1:5.

The block polymer (P) may have an average molecular weight of preferably at least 500 g/mol, more preferably at least 750 g/mol, most preferably at least 1000 g/mol, particularly preferably at least 1250 g/mol, particularly more preferably at least 1500 g/mol, particularly most preferably at least 1750 g/mol, for example at least 2000 g/mol. The block polymer (P) may have an average molecular weight of preferably up to 15000 g/mol, more preferably up to 12500 g/mol, most preferably up to 10000 g/mol, particularly preferably up to 8000 g/mol, particularly more preferably up to 6000 g/mol, particularly most preferably up to 5000 g/mol, particularly up to 4000 g/mol, for example up to 3000 g/mol. The block polymer (P) may have an average molecular weight of from 500 to 10000 g/mol, preferably of from 1000 to 6000 g/mol, and particularly from 1500 to 5000 g/mol. The molecular weight may be determined based on the hydroxy number.

The block polymer (P) may have a surface tension of preferably 25 to 55 mN/m, more preferably of 30 to 50 mN/m, more preferably of 33 to 47 mN/m, and particularly of 36 to 43 mN/m, at a concentration of 1 g/L in water at 23° C. as measured according to DIN 53914.

The block polymer (P) may have a wetting power of preferably >50 sec, more preferably >100 sec, most preferably >150 sec, particularly preferably >200 sec, particularly >250 sec as measured according to EN 1772 (1 g/L distilled water with 2 g/L soda ash at 23° C.).

The block polymer (P) may have a foam formation of preferably <100 ml, more preferably <50 ml, most preferably <20 ml, particularly <10 ml as measured according to EN 12728, 40° C., 2 g/l in water with 1.8 mmol $Ca^{2+}$-Ions/l, after 30 sec.

The block polymer (P) may have a viscosity of preferably between 50 mPa*s and 900 mPa*s, more preferably between 200 mPa*s and 750 mPa*s, most preferably between 350 mPa*s and 600 mPa*s, particularly preferably between 450 mPa*s and 550 mPa*s as measured according to EN 12092, 23° C., Brookfield, 60 rpm.

In case the block polymer (P) is a (EO-PO-EO) triblock polymer of the general formula (Q1), the block polymer (P) may have a viscosity of preferably between 50 mPa*s and 900 mPa*s, more preferably between 200 mPa*s and 750 mPa*s, most preferably between 300 mPa*s and 550 mPa*s, particularly preferably between 350 mPa*s and 450 mPa*s as measured according to EN 12092, 23° C., Brookfield, 60 rpm.

In a particularly preferred embodiment, the block polymer (P) is or comprises a polyethyleneoxide polypropyleneoxide polyethyleneoxide (EO-PO-EO) triblock polymer. The polypropyleneoxide moiety in the EO-PO-EO triblock polymer may have a molar mass of 250 to 5000 g/mol, preferably from 400 to 3000 g/mol, and in particular from 600 to 1500 g/mol. The EO-PO-EO triblock polymer may contain 3 to 90 mol %, preferably 25 to 85 mol %, and in particular 50 to 80 mol % of the polypropyleneoxide moiety.

In a particularly preferred embodiment, the block polymer (P) is or comprises a polyethyleneoxide polypropyleneoxide polyethyleneoxide polypropyleneoxide polyethyleneoxide (EO-PO-EO-PO-EO) pentablock polymer. The polypropyleneoxide moiety in the EO-PO-EO-PO-EO pentablock polymer may have a molar mass of 500 to 5000 g/mol, preferably from 750 to 3500 g/mol, and in particular from 1000 to 2500 g/mol. The EO-PO-EO triblock polymer may contain 3 to 90 mol %, preferably 25 to 80 mol %, and in particular 50 to 70 mol % of the polypropyleneoxide moiety.

In a preferred embodiment, the block polymer (P) is contained in an amount of at least 4 wt.-%, more preferably at least 8 wt.-%, most preferably at least 12 wt.-%, particularly preferably at least 16 wt.-%, particularly more preferably at least 20 wt.-%, particularly even more preferably at least 24 wt.-%, particularly most preferably at least 28 wt.-%, for example preferably at least 32 wt.-%, for example more preferably at least 36 wt.-%, for example even more preferably at least 40 wt.-%, for example most preferably at least 44 wt.-%, for example at least 48 wt.-%, based on the total weight of the composition A.

In a preferred embodiment, the block polymer (P) is contained in an amount of at most 96 wt.-%, more preferably at most 92 wt.-%, most preferably at most 88 wt.-%, particularly preferably at most 84 wt.-%, particularly more preferably at most 80 wt.-%, particularly even more preferably at most 76 wt.-%, particularly most preferably at most 72 wt.-%, for example preferably at most 68 wt.-%, for example more preferably at most 64 wt.-%, for example even more preferably at most 60 wt.-%, for example most preferably at most 56 wt.-%, for example at most 52 wt.-%, based on the total weight of the composition A.

In a preferred embodiment, the block polymer (P) is contained in an amount of from 4 wt.-% to 96 wt.-%, more preferably from 8 wt.-% to 92 wt.-%, most preferably from 12 wt.-% to 88 wt.-%, particularly preferably from 16 w.-% to 84 wt.-%, particularly more preferably from 20 wt.-% to 80 wt.-%, particularly even more preferably from 24 wt.-% to 76 wt.-%, particularly most preferably from 28 wt.-% to 72 wt.-%, for example preferably from 32 wt.-% to 68 wt.-%, for example more preferably from 36 wt.-% to 64 wt.-%, for example even more preferably from 40 wt.-% to 60 wt.-%, for example most preferably from 44 wt.-% to 56 wt.-%, for example from 48 wt.-% to 52 wt.-%, based on the total weight of the composition A.

According to the present invention, the alcohol alkoxylate (E) is contained in the composition A.

According to the present invention, the alcohol alkoxylate (E) is also contained in the composition B.

The alcohol alkoxylates (E) are selected in particular among alcohol alkoxylates of the formula (I)

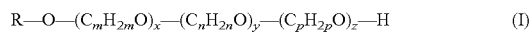

$$R\text{—}O\text{—}(C_mH_{2m}O)_x\text{—}(C_nH_{2n}O)_y\text{—}(C_pH_{2p}O)_z\text{—}H \qquad (I)$$

in which

R is branched $C_5$-$C_{30}$-alkyl;

m, n, p independently of one another are an integer from 2 to 16, preferably 2, 3, 4 or 5;

x+y+z have a value of 1 to 100.

In a preferred embodiment, m is 2, and x is from 1 to 20, more preferably from 2 to 15, most preferably from 3 to 10, particularly from 4 to 8, particularly more preferably from 4.5 to 6.5, particularly most preferably from 5.0 to 5.5.

In another preferred embodiment, n is 3, and y is from 1 to 20, more preferably from 2 to 15, most preferably from 2 to 10, particularly from 3 to 8, particularly more preferably from 4 to 6, particularly most preferably from 4.5 to 5.0.

In another preferred embodiment, p is 2, and z is from 1 to 20, more preferably from 1 to 15, most preferably from 1 to 10, particularly from 1 to 6, particularly more preferably from 1.5 to 3.5, particularly most preferably from 2 to 2.5.

In an especially preferred embodiment, m is 2, x is from 5.0 to 5.5, n=3, y is from 4.5 to 5.0, p=2, and z is from 2 to 2.5.

In accordance with a particular embodiment, alcohol alkoxylates of the formula (I) are used in which m=2 and the value of x is greater than 0. These are alcohol alkoxylates of the EO type, which include mainly alcohol ethoxylates (m=2; x>0; y, z=0) and alcohol alkoxylates with an EO block bonded to the alcohol moiety (m=2; x>0; y and/or z>0). Substances which must be mentioned among the alcohol alkoxylates with an EO block bonded to the alcohol moiety are mainly EO/PO block alkoxylates (m=2; x>0; y>0; n=3; z=0), and EO/PO/EO block alkoxylates (m, p=2; x, z>0; y>0; n=3).

Preferred substances are EO/PO block alcohol alkoxylates in which the EO:PO ratio is 1:1 to 4:1, in particular 1.3:1 to 3:1. In this context, the degree of ethoxylation is, as a rule, 1 to 20, preferably 2 to 15, in particular 4 to 10, and the degree of propoxylation is, as a rule, 1 to 20, preferably 1 to 8, in particular 2 to 6. The total degree of alkoxylation, i.e. the total of EO and PO units, is, as a rule, 2 to 40, preferably 3.to 25, in particular 6 to 15.

In accordance with a further particular embodiment, alcohol alkoxylates of the formula (I) are used in which n=2, the values of x and y are both greater than 0 and z=0. Again, these alcohol alkoxylates take the form of the EO type, with the EO block being bonded terminally, however. These include mainly PO/EO block alcohol alkoxylates (n=2; x>0; y>0; m=3; z=0).

Preferred PO/EO block alcohol alkoxylates are those in which the PO:EO ratio is 1:10 to 3:1, in particular 1:6 to 1.5:1. In this context, the degree of ethoxylation is, as a rule, 1 to 20, preferably 2 to 15, in particular 4 to 10, and the degree of propoxylation is, as a rule, 0.5 to 10, preferably 0.5 to 8, in particular 1 to 6. The total degree of alkoxylation, i.e. the total of EO and PO units, is, as a rule, 1.5 to 30, preferably 2.5 to 21, in particular 5 to 16.

In accordance with a preferred embodiment, the alcohol alkoxylates to be used in accordance with the invention are based on primary, alpha-branched alcohols of the general formula (II)

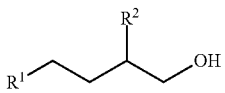
(II)

in which
R[1], R[2] independently of one another are hydrogen or $C_1$-$C_{26}$-alkyl.

Preferably, R[1] and R[2] independently of one another are $C_1$-$C_6$-alkyl, in particular $C_2$-$C_4$-alkyl, for example $C_3$-alkyl.

Very especially preferred are alcohol alkoxylates which are based on 2-propylheptanol. These include, in particular, alcohol alkoxylates of the formula (I) in which R is a 2-propylheptyl radical, i.e. R[1] and R[2] in formula (II) are in each case n-propyl.

Such alcohols are also referred to as Guerbet alcohols. They can be obtained for example by dimerization of corresponding primary alcohols (for example $R^{1,2}$CH2CH2OH) at elevated temperature, for example 180 to 300° C., in the presence of an alkaline condensing agent such as potassium hydroxide.

Alkoxylates which are employed for the purposes of this preferred embodiment, which is based on Guebert alcohols, are mainly alkoxylates of the EO type. Particularly preferred are ethoxylates with a degree of ethoxylation of 1 to 50, preferably 2 to 20, in particular approximately 3 to 10. The correspondingly ethoxylated 2-propylheptanols may be mentioned especially among these.

In accordance with a further preferred embodiment, the alcohol alkoxylates to be used are based on C13-oxo alcohols.

As a rule, the term "C13-oxo alcohol" refers to an alcohol mixture whose main component is formed by at least one branched C13-alcohol (isotridecanol). Such C13-alcohols include, in particular, tetramethylnonanols, for example 2,4,6,8-tetramethyl-1-nonanol or 3,4,6,8-tetramethyl-1-nonanol and furthermore ethyldimethylnonanols such as 5-ethyl-4,7-dimethyl-1-nonanol.

Suitable C13-alcohol mixtures can generally be obtained by hydrogenation of hydroformylated trimeric butane, as described in US2005/0170968. In particular, it is possible to proceed as follows:
a) butenes are brought into contact with a suitable catalyst for oligomerization,
b) a C12-olefin fraction is isolated from the reaction mixture,
c) the C12-olefin fraction is hydroformylated by reaction with carbon monoxide and hydrogen in the presence of a suitable catalyst, and
d) hydrogenated.

Advantageous C13-alcohol mixtures are essentially free from halogens, i.e. they contain less than 3 ppm by weight, in particular less than 1 ppm by weight, of halogen, in particular chlorine.

Further suitable C13-alcohol mixtures can be obtained by proceeding as follows:
a) subjecting a C4-olefin mixture to metathesis,
b) separating olefins having 6 C atoms from the metathesis mixture,
c) subjecting the olefins which have been separated off, individually or as a mixture, to a dimerization to give olefins mixtures having 12 C atoms, and
d) subjecting the resulting olefin mixture, if appropriate after fractionation, to derivatization to give a C13-oxo alcohol mixture.

The alcohol alkoxylates (E) may have an average molecular weight of preferably at least 200 g/mol, more preferably at least 300 g/mol, most preferably at least 400 g/mol, particularly preferably at least 500 g/mol, particularly more preferably at least 600 g/mol, particularly most preferably at least 650 g/mol. The alcohol alkoxylates (E) may have an average molecular weight of preferably up to 10000 g/mol, more preferably up to 5000 g/mol, most preferably up to 3000 g/mol, particularly preferably up to 2000 g/mol, particularly more preferably up to 1500 g/mol, particularly most preferably up to 1200 g/mol, particularly up to 1000 g/mol, for example up to 850 g/mol. The alcohol alkoxylates (E) may have an average molecular weight of from 300 to 2000 g/mol, preferably from 400 to 1000 g/mol, and particularly from 650 to 850 g/mol.

The alcohol alkoxylates (E) may have a surface tension of preferably 15 to 45 mN/m, more preferably of 20 to 40 mN/m, more preferably of 23 to 36 mN/m, and particularly of 25 to 31 mN/m, at a concentration of 1 g/L in water at 23° C. as measured according to DIN 53914.

The alcohol alkoxylates (E) may have a wetting power of preferably >5 sec, more preferably >8 sec, most preferably >11 sec, particularly preferably >13 sec, particularly >15 sec as measured according to EN 1772 (1 g/L distilled water with 2 g/L soda ash at 23° C.).

The alcohol alkoxylate (E) may have a foam formation of preferably between 5 ml and 100 ml, more preferably between 5 ml and 50 ml, most preferably between 5 ml and 25 ml as measured according to EN 12728, 40° C., 2 g/l in water with 1.8 mmol $Ca^{2+}$-Ions/l, after 30 sec.

The alcohol alkoxylate (E) may have a viscosity of preferably between 20 mPa*s and 500 mPa*s, more preferably between 50 mPa*s and 250 mPa*s, most preferably between 100 mPa*s and 160 mPa*s as measured according to EN 12092, 23° C., Brookfield, 60 rpm.

In a preferred embodiment, the alcohol alkoxylate (E) is contained in an amount of at least 4 wt.-%, more preferably at least 8 wt.-%, most preferably at least 12 wt.-%, particularly preferably at least 16 wt.-%, particularly more preferably at least 20 wt.-%, particularly even more preferably at least 24 wt.-%, particularly most preferably at least 28 wt.-%, for example preferably at least 32 wt.-%, for example more preferably at least 36 wt.-%, for example even more preferably at least 40 wt.-%, for example most preferably at least 44 wt.-%, for example at least 48 wt.-%, based on the total weight of the composition A.

In a preferred embodiment, the alcohol alkoxylate (E) is contained in an amount of at most 96 wt.-%, more preferably at most 92 wt.-%, most preferably at most 88 wt.-%, particularly preferably at most 84 wt.-%, particularly more preferably at most 80 wt.-%, particularly even more preferably at most 76 wt.-%, particularly most preferably at most 72 wt.-%, for example preferably at most 68 wt.-%, for example more preferably at most 64 wt.-%, for example even more preferably at most 60 wt.-%, for example most preferably at most 56 wt.-%, for example at most 52 wt.-%, based on the total weight of the composition A.

In a preferred embodiment, the alcohol alkoxylate (E) is contained in an amount of from 4 wt.-% to 96 wt.-%, more preferably from 8 wt.-% to 92 wt.-%, most preferably from 12 wt.-% to 88 wt.-%, particularly preferably from 16 w.-% to 84 wt.-%, particularly more preferably from 20 wt.-% to 80 wt.-%, particularly even more preferably from 24 wt.-% to 76 wt.-%, particularly most preferably from 28 wt.-% to 72 wt.-%, for example preferably from 32 wt.-% to 68 wt.-%, for example more preferably from 36 wt.-% to 64 wt.-%, for example even more preferably from 40 wt.-% to 60 wt.-%, for example most preferably from 44 wt.-% to 56 wt.-%, for example from 48 wt.-% to 52 wt.-%, based on the total weight of the composition A.

In a preferred embodiment, the alcohol alkoxylate (E) is contained in an amount of at least 4 wt.-%, more preferably at least 8 wt.-%, most preferably at least 12 wt.-%, particularly preferably at least 16 wt.-%, particularly more preferably at least 20 wt.-%, particularly even more preferably at least 24 wt.-%, particularly most preferably at least 28 wt.-%, for example preferably at least 32 wt.-%, for example more preferably at least 36 wt.-%, for example even more preferably at least 40 wt.-%, for example most preferably at least 44 wt.-%, for example at least 48 wt.-%, based on the total weight of the composition B.

In a preferred embodiment, the alcohol alkoxylate (E) is contained in an amount of at most 96 wt.-%, more preferably at most 92 wt.-%, most preferably at most 88 wt.-%, particularly preferably at most 84 wt.-%, particularly more preferably at most 80 wt.-%, particularly even more preferably at most 76 wt.-%, particularly most preferably at most 72 wt.-%, for example preferably at most 68 wt.-%, for example more preferably at most 64 wt.-%, for example even more preferably at most 60 wt.-%, for example most preferably at most 56 wt.-%, for example at most 52 wt.-%, based on the total weight of the composition B.

In a preferred embodiment, the alcohol alkoxylate (E) is contained in an amount of from 4 wt.-% to 96 wt.-%, more preferably from 8 wt.-% to 92 wt.-%, most preferably from 12 wt.-% to 88 wt.-%, particularly preferably from 16 w.-% to 84 wt.-%, particularly more preferably from 20 wt.-% to 80 wt.-%, particularly even more preferably from 24 wt.-% to 76 wt.-%, particularly most preferably from 28 wt.-% to 72 wt.-%, for example preferably from 32 wt.-% to 68 wt.-%, for example more preferably from 36 wt.-% to 64 wt.-%, for example even more preferably from 40 wt.-% to 60 wt.-%, for example most preferably from 44 wt.-% to 56 wt.-%, for example from 48 wt.-% to 52 wt.-%, based on the total weight of the composition B.

According to the present invention, an alcohol ethoxylate (L) of the general formula (III)

$$R^3—O—(C_2H_4O)_s—H \qquad (III)$$

wherein $R^3$ is branched $C_8$ to $C_{20}$ alkyl, and s has a value of from 1 to 40 is contained in the composition B.

In the formula (III) of the alcohol ethoxylate (L), $R^3$ is preferably branched $C_{10}$ to C15 alkyl, more preferably branched $C_{12}$ to $C_{14}$ alkyl, most preferably isotridecyl.

In the formula (III) of the alcohol ethoxylate (L), s has a value of from 1 to 40, preferably 2 to 30, more preferably 3 to 20, most preferably 4 to 15, particularly preferably 5 to 10, particularly preferably 7 to 9, for example 8.

Suitable C13-alcohol mixtures, for example isotridecanol mixtures, as precursor for alcohol ethoxylate (L), can generally be obtained by hydrogenation of hydroformylated trimeric butene. In particular, it is possible to proceed as follows:

a) butenes are brought into contact with a suitable catalyst for oligomerization, b) a C12-olefin fraction is isolated from the reaction mixture, c) the C12-olefin fraction is hydroformylated by reacton with carbon monoxide and hydrogen in the presence of a suitable catalyst, and d) hydrogenated.

The synthesis of alcohol ethoxylates (L) are also described in US2005/170968.

As a rule, C13-alcohol mixtures for example isotridecanol mixtures, as precursor for alcohol ethoxylate (L), have a mean degree of branching of from 1 to 4, preferably from 2 to 3, in particular from 2.3 to 2.7. The degree of branching is defined as the number of methyl groups in one molecule of the alcohol minus 1. The mean degree of branching is the statistical mean of the degrees of branching of the molecules of a sample. The mean number of methyl groups in the molecules of a sample can be determined readily by 'H-NMR spectroscopy. For this purpose, the signal area corresponding to the methyl protons in the 'H-NMR spectrum of a sample is divided by three and then divided by the signal area of the methylene protons if the $CH_n$—OH group divided by two.

The alcohol ethoxylate (L) may have an average molecular weight of preferably at least 200 g/mol, more preferably at least 300 g/mol, most preferably at least 350 g/mol, particularly preferably at least 400 g/mol, particularly more preferably at least 450 g/mol, particularly most preferably at least 500 g/mol. The alcohol alkoxylates (E) may have an average molecular weight of preferably up to 2000 g/mol, more preferably up to 1500 g/mol, most preferably up to 1000 g/mol, particularly preferably up to 800 g/mol, particularly more preferably up to 700 g/mol, particularly most preferably up to 650 g/mol, particularly up to 600 g/mol. The alcohol ethoxylate (L) may have an average molecular weight of from 200 to 2000 g/mol, preferably from 400 to 1000 g/mol, and particularly from 500 to 600 g/mol.

The alcohol ethoxylate (L) may have a surface tension of preferably 15 to 45 mN/m, more preferably of 20 to 40 mN/m, more preferably of 23 to 36 mN/m, and particularly of 25 to 31 mN/m, at a concentration of 1 g/L in water at 23° C. as measured according to DIN 53914.

The alcohol ethoxylate (L) may have a wetting power of preferably >7 sec, more preferably >12 sec, most preferably >16 sec, particularly preferably >19 sec, particularly >22 sec as measured according to EN 1772 (1 g/L distilled water with 2 g/L soda ash at 23° C.).

The alcohol ethoxylate (L) may have a foam formation of preferably between 100 ml and 1000 ml, more preferably 200 ml and 800 ml, most preferably 400 ml and 700 ml as measured according to EN 12728, 40° C., 2 g/l in water with 1.8 mmol $Ca^{2+}$-Ions/l, after 30 sec.

The alcohol ethoxylate (L) may have a viscosity of preferably between 20 mPa*s and 500 mPa*s, more preferably between 60 mPa*s and 280 mPa*s, most preferably between 120 mPa*s and 180 mPa*s as measured according to EN 12092, 23° C., Brookfield, 60 rpm.

In a preferred embodiment, the alcohol ethoxylate (L) is contained in an amount of at least 4 wt.-%, more preferably at least 8 wt.-%, most preferably at least 12 wt.-%, particularly preferably at least 16 wt.-%, particularly more preferably at least 20 wt.-%, particularly even more preferably at least 24 wt.-%, particularly most preferably at least 28 wt.-%, for example preferably at least 32 wt.-%, for example more preferably at least 36 wt.-%, for example even more preferably at least 40 wt.-%, for example most preferably at least 44 wt.-%, for example at least 48 wt.-%, based on the total weight of the composition B.

In a preferred embodiment, the alcohol ethoxylate (L) is contained in an amount of at most 96 wt.-%, more preferably at most 92 wt.-%, most preferably at most 88 wt.-%, particularly preferably at most 84 wt.-%, particularly more preferably at most 80 wt.-%, particularly even more preferably at most 76 wt.-%, particularly most preferably at most 72 wt.-%, for example preferably at most 68 wt.-%, for example more preferably at most 64 wt.-%, for example even more preferably at most 60 wt.-%, for example most preferably at most 56 wt.-%, for example at most 52 wt.-%, based on the total weight of the composition B.

In a preferred embodiment, the alcohol ethoxylate (L) is contained in an amount of from 4 wt.-% to 96 wt.-%, more preferably from 8 wt.-% to 92 wt.-%, most preferably from 12 wt.-% to 88 wt.-%, particularly preferably from 16 w.-% to 84 wt.-%, particularly more preferably from 20 wt.-% to 80 wt.-%, particularly even more preferably from 24 wt.-% to 76 wt.-%, particularly most preferably from 28 wt.-% to 72 wt.-%, for example preferably from 32 wt.-% to 68 wt.-%, for example more preferably from 36 wt.-% to 64 wt.-%, for example even more preferably from 40 wt.-% to 60 wt.-%, for example most preferably from 44 wt.-% to 56 wt.-%, for example from 48 wt.-% to 52 wt.-%, based on the total weight of the composition B.

Preferably, the area of groundcover, such as soil, is treated at a rate corresponding to 0.1 to 20 L/ha (L=liter of the composition A or composition B; ha=hectare), more preferably 0.5 L/ha to 10 L/ha, most preferably 1 L/ha to 7 L/ha, particularly preferably 1.5 L/ha to 4 L/ha, for example 1.7 L/ha to 2.5 L/ha as a banded application.

Preferably, the area of groundcover, such as soil, is treated at a rate corresponding to 0.1 to 200 L/ha (L=liter of the composition A or composition B; ha=hectare), more preferably 0.5 L/ha to 100 L/ha, most preferably 2 L/ha to 70 L/ha, particularly preferably 4 L/ha to 50 L/ha, for example 10 L/ha to 30 L/ha as a blanket application.

The composition A may also include kit-of-parts comprising

A1) a block polymer (P) comprising at least one polyethyleneoxide moiety and at least one polypropyleneoxide moiety, and A2) an alcohol alkoxylate (E).

The composition B may also include kit-of-parts comprising

B1) an alcohol ethoxylate (L) of the general formula (III)

$$R^3-O-(C_2H_4O)_s-H \quad (III)$$

wherein $R^3$ is branched $C_8$ to $C_{20}$ alkyl, and
s has a value of from 1 to 40
and B2) an alcohol alkoxylate (E).

Here, the term "kit-of-parts" is to be understood to denote a kit comprising at least two separate parts wherein each of the parts can be independently removed from the kit. A kit includes a box, a tool, a vessel, a container, a bag or any kit-like equipment. Also a kit whose separate parts are only together in this one kit for an extremely short period of time are regarded as kit-of-parts. Kit-of-parts are useful for the combined application (of the contents) of the separate parts of the kit.

In another embodiment, the composition A may be formulated separately but applied in a temporal relationship, i.e. simultaneously or subsequently, the subsequent application having a time interval which allows a combined action of the compounds, e.g. the compounds A1) and A2).

In another embodiment, the composition B may be formulated separately but applied in a temporal relationship, i.e. simultaneously or subsequently, the subsequent application having a time interval which allows a combined action of the compounds, e.g. the compounds B1) and B2).

The composition A or composition B may also additionally comprise further components.

The composition A or composition B may also additionally comprise a fertilizer, preferably a urea-containing fertilizer, and/or P-containing fertilizer, and/or a K fertilizer (potassium-containing fertilizer), and/or a N fertilizer (nitrogen-containing fertilizer), and/or a NK fertilizer (nitrogen-potassium fertilizer), and/or a NPK (nitrogen-phosphorus-potassium fertilizer), and/or a single or dual element fertilizer containing S, Ca, Mg, Fe, Mn, Cu, Zn, Mo, B, Ni, Cl, or a combination therefore.

The amount of the applied N and K containing fertilizers per ha may be preferably in the range of 5 to 250 kg/ha per element, more preferably in the range of 10 to 200 kg/ha per element, most preferably in the range of 15 to 150 kg/ha per element, particularly preferably in the range of 20 to 100 kg/ha per element, particularly in the range of 30 to 80 kg/ha per element. The amount of the applied fertilizers containing S, Ca, Mg, and P may be preferably in the range of 1 to 70 kg/ha per element, more preferably in the range of 3 to 60 kg/ha per element, most preferably in the range of 5 to 50 kg/ha per element, particularly preferably in the range of 10 to 40 kg/ha per element, particularly in the range of 15 to 30 kg/ha per element. The amount of the applied fertilizers containing Fe, Mn, Cu, Zn, and Cl may be preferably in the range of 0.005 to 6 kg/ha per element, more preferably in the range of 0.05 to 5 kg/ha per element, most preferably in the range of 0.5 to 4 kg/ha per element, particularly preferably in the range of 1 to 3 kg/ha per element. The amount of the applied fertilizers containing Mo and Ni may be preferably in the range of 0.003 to 0.6 kg/ha per element, more preferably in the range of 0.03 to 0.5 kg/ha per element, most preferably in the range of 0.06 to 0.4 kg/ha per element, particularly preferably in the range of 0.1 to 0.3 kg/ha per element As used herein, the term "fertilizer" includes any chemical compound that improves the levels of available plant nutrients and/or the chemical and physical properties of soil, thereby directly or indirectly promoting plant growth, yield, and quality. Fertilizers are typically applied either through the soil (for uptake by plant roots) or by foliar feeding (for uptake through leaves). The term "fertilizer" can be subdivided into two major categories: a) organic fertilizers (composed of decayed plant/animal matter) and b) inorganic fertilizers (composed of chemicals and minerals). Inorganic fertilizers are usually manufactured through chemical processes (such as the Haber-Bosch process), also using naturally occurring deposits, while chemically altering them (e.g. concentrated triple superphosphate). Naturally occurring water soluble inorganic fertilizers include Chilean sodium nitrate.

As used herein, a "urea-containing fertilizer" is defined as a fertilizer comprising at least one component selected from the group consisting of urea, urea ammonium nitrate (UAN), and suspensions of isobutylidene diurea (IBDU), crotonylidene diurea (CDU) and urea formaldehyde (UF), urea-acetaldehyde, and ureaglyoxal condensates.

In a preferred embodiment of the invention, the urea-containing fertilizer is urea or urea ammonium nitrate (UAN).

In customary commercial fertilizer quality, the urea has a purity of at least 90%, and may for example be in crystalline, granulated, compacted, prilled or ground form.

As used herein, the "P-containing fertilizer" is any fertilizer providing any form of the chemical element phosphorus (P) or containing any chemical compounds incorporating the chemical element phosphorus (P), including but not limited to phosphate-containing fertilizers or fertilizers containing P. Preferably, the P-containing fertilizer is selected from the group consisting of a NPK fertilizer, a NP fertilizer, a PK fertilizer, or a P fertilizer. Most preferably, the P-containing fertilizer is a NPK fertilizer. Of course, also combinations of these fertilizers may be used as additional P-containing fertilizer.

P fertilizers, K fertilizers, and N fertilizers are straight fertilizers, i.e. fertilizers that contain only one of the nutritive elements P, K, and N. It is to be understood, however, that these fertilizers may additionally comprise at least one additional nutritive element selected from S, Ca, Mg, Fe, Mn, Cu, Zn, Mo, B, Ni, and Cl.

NPK fertilizers, NP fertilizers, and PK fertilizers are multinutrient fertilizers, i.e. fertilizers that comprise combinations of the nutritive elements P, K, and N as indicated by the terms "NPK", "NP", and "PK". It is to be understood, however, that these fertilizers may additionally comprise at least one additional nutritive element selected from S, Ca, Mg, Fe, Mn, Cu, Zn, Mo, B, Ni and Cl.

The NPK fertilizers, NP fertilizers, and PK fertilizers may be provided as complex fertilizers or bulk-blend or blended fertilizers. The term complex fertilizer refers to a compound fertilizer formed by mixing ingredients that react chemically. In bulk-blend or blended fertilizers, two or more granular fertilizers of similar size are mixed to form a compound fertilizer.

Dual element fertilizers are preferably dual element fertilizers with Ca, Mg, Fe, Mn, Zn or Ni which may be applied as soluble salts of chloride, sulfate, nitrate or in chelated form (e.g. MnEDTA, Fe EDTA, FeEDDHA).

Single or dual element fertilizers of Mo are available as salts of molybdate, B as boric acid or borates.

The composition A and the fertilizer can be applied to an area of groundcover, for example to the surface of soil, simultaneously or subsequently—either first the composition A followed by the fertilizer or first the fertilizer followed by the composition A—with a specific time interval. This time interval may be 2 hours, 6 hours, 12 hours, 24 hours, 2 days, 3 days, 4 days, 5 days, 6 days or more.

The composition B and the fertilizer can be applied to an area of groundcover, for example to the surface of soil, simultaneously or subsequently—either first the composition B followed by the fertilizer or first the fertilizer followed by the composition B—with a specific time interval. This time interval may be 2 hours, 6 hours, 12 hours, 24 hours, 2 days, 3 days, 4 days, 5 days, 6 days or more.

It is to be understood that the composition A or composition B may further comprise auxiliaries such as solvents, solid carriers, surfactants, adjuvants, thickeners, bactericides, anti-freezing agents, anti-foaming agents, colorants, tackifiers, binders, preservatives, antioxidants, and odorants.

Suitable auxiliaries are solvents, liquid carriers, solid carriers or fillers, surfactants, dispersants, emulsifiers, wetters, adjuvants, solubilizers, penetration enhancers, protective colloids, adhesion agents, thickeners, humectants, compatibilizers, bactericides, anti-freezing agents, anti-foaming agents, colorants, tackifiers and binders.

Suitable solvents and liquid carriers are water and organic solvents, such as mineral oil fractions of medium to high boiling point, e.g. kerosene, diesel oil; oils of vegetable or animal origin; aliphatic, cyclic and aromatic hydrocarbons, e.g. toluene, paraffin, tetrahydronaphthalene, alkylated naphthalenes; alcohols, e.g. ethanol, propanol, butanol, cyclohexanol; glycols; DMSO; ketones, e.g. cyclohexanone; esters, e.g. lactates, carbonates, fatty acid esters, gammabutyrolactone; fatty acids; phosphonates; amines; amides, e.g. N-methylpyrrolidone, fatty acid dimethylamides; and mixtures thereof.

Suitable solid carriers or fillers are mineral earths, e.g. silicates, silica gels, talc, kaolins, limestone, lime, chalk, clays, dolomite, diatomaceous earth, bentonite, calcium sulfate, magnesium sulfate, magnesium oxide; polysaccharides, e.g. cellulose, starch; fertilizers, e.g. ammonium sulfate, ammonium phosphate, ammonium nitrate, ureas; products of vegetable origin, e.g. cereal meal, tree bark meal, wood meal, nutshell meal, and mixtures thereof.

Suitable surfactants are surface-active compounds, such as anionic, cationic, nonionic and amphoteric surfactants, block polymers, polyelectrolytes, and mixtures thereof. Such surfactants can be used as emulsifier, dispersant, solubilizer, wetter, penetration enhancer, protective colloid, or adjuvant. Examples of surfactants are listed in McCutcheon's, Vol. 1: Emulsifiers & Detergents, McCutcheon's Directories, Glen Rock, USA, 2008 (International Ed. or North American Ed.).

Suitable anionic surfactants are alkali, alkaline earth or ammonium salts of sulfonates, sulfates, phosphates, carboxylates, and mixtures thereof. Examples of sulfonates are alkylarylsulfonates, diphenylsulfonates, alpha-olefin sulfonates, lignine sulfonates, sulfonates of fatty acids and oils, sulfonates of ethoxylated alkylphenols, sulfonates of alkoxylated arylphenols, sulfonates of condensed naphthalenes, sulfonates of dodecyl- and tridecylbenzenes, sulfonates of naphthalenes and alkylnaphthalenes, sulfosuccinates or sulfosuccinamates. Examples of sulfates are sulfates of fatty acids and oils, of ethoxylated alkyl phenols, of alcohols, of ethoxylated alcohols, or of fatty acid esters. Examples of phosphates are phosphate esters. Examples of carboxylates are alkyl carboxylates, and carboxylated alcohol or alkylphenol ethoxylates.

Suitable non-ionic surfactants are alkoxylates, N-substituted fatty acid amides, amine oxides, esters, sugar-based surfactants, polymeric surfactants, and mixtures thereof. Examples of alkoxylates are compounds such as alcohols, alkylphenols, amines, amides, aryl phenols, fatty acids or fatty acid esters which have been alkoxylated with 1 to 50 equivalents. Ethylene oxide and/or propylene oxide may be employed for the alkoxylation, preferably ethylene oxide. Examples of N-substituted fatty acid amides are fatty acid glucamides or fatty acid alkanolamides. Examples of esters are fatty acid esters, glycerol esters or monoglycerides. Examples of sugar-based surfactants are sorbitans, ethoxylated sorbitans, sucrose and glucose esters or alkylpolyglucosides. Examples of polymeric surfactants are home- or copolymers of vinylpyrrolidone, vinylalcohols, or vinylacetate.

Suitable cationic surfactants are quaternary surfactants, for example quaternary ammonium compounds with one or two hydrophobic groups, or salts of long-chain primary amines. Suitable amphoteric surfactants are alkylbetains and imidazolines. Suitable block polymers are block polymers of the A-B or A-B-A type comprising blocks of polyethylene oxide and polypropylene oxide or of the A-B-C type comprising alkanol, polyethylene oxide and polypropylene oxide. Suitable polyelectrolytes are polyacids or polybases. Examples of polyacids are alkali salts of polyacrylic acid or polyacid comb polymers. Examples of polybases are polyvinylamines or polyethyleneamines.

Suitable adjuvants are compounds, which have a neglectable or even no pesticidal activity themselves. Examples are surfactants, mineral or vegetable oils, and other auxiliaries. Further examples are listed by Knowles, Adjuvants and additives, Agrow Reports OS256, T&F Informa UK, 2006, chapter 5.

Suitable thickeners are polysaccharides (e.g. xanthan gum, carboxymethylcellulose), anorganic clays (organically modified or unmodified), polycarboxylates, and silicates.

Suitable bactericides are bronopol and isothiazolinone derivatives such as alkylisothiazolinones and benzisothiazolinones.

Suitable anti-freezing agents are ethylene glycol, propylene glycol, urea and glycerin.

Suitable anti-foaming agents are silicones, long chain alcohols, and salts of fatty acids.

Suitable colorants (e.g. in red, blue, or green) are pigments of low water solubility and water-soluble dyes. Examples are
  inorganic colorants, such as iron oxide, titan oxide, iron hexacyanoferrate,
  metal-complex dyes such as chromium-complex dyes, for example Orasol Yellow 141,
  organic colorants such as alizarin-, azo- and phthalocyanine colorants.

Preferred colorants are metal-complex dyes, more preferably chromium-complex dyes Suitable tackifiers or binders are polyvinylpyrrolidones, polyvinylacetates, polyvinyl alcohols, polyacrylates, biological or synthetic waxes, and cellulose ethers.

Suitable preservatives include e.g. sodium benzoate, benzoic acid, sorbic acid, and derivatives thereof.

Suitable antioxidants include sulfites, ascorbic acid, tocopherol, tocopherol acetate, tocotrienol, melatonin, carotene, beta-carotene, ubiquinol, and derivatives thereof. Tocophercol acetate is preferred as antioxidant.

Experimental Details

Synthesis of the Alcohol Alkoxylate (E1)

158.2 g (1.0 mol) 2-Propylheptanol isomer mixture and 1.5 g of potassium hydroxide as alkoxylation catalyst were introduced into an autoclave. After a dehydration phase followed by inertisation with nitrogen, 228.8 g of ethylene oxide (corresponding to 5.2 mol) were passed in continuously at 145 to 155° C. To complete the reaction, stirring was continued for 1 hour at the same temperature. The temperature was then lowered to 125 to 135° C. and 272.6 g of propylene oxide (corresponding to 4.7 mol) were passed in continuously. To complete the reaction, stirring was continued for 5 hour at the same temperature. Then the temperature was raised to 145 to 155° C. and 101.2 g of ethylene oxide (corresponding to 2.3 mol) were passed in continuously. To complete the reaction, stirring was continued for 1 hour at the same temperature. The reaction product was neutralized with acetic acid at 80° C. to a pH of 6 to 7.

The product (E1) had the following properties:
  Hydroxyl number (DIN 53240, phthalic anhydride method): Approx. 72 mg KOH/g
  Molecular weight (calculated based on the hydroxyl number): approx. 770
  Viscosity (EN 12092, 23° C., Brookfield, 60 rpm): approx. 130 mPa*s
  Wetting power (EN 1772, 1 g/l in distilled water with 2 g/l soda ash at 23° C.): 17 sec
  Foam formation (EN 12728, 40° C., 2 g/l in water with 1.8 mmol $Ca^{2+}$-Ions/l, after 30 sec): 15 ml
  Surface tension (DIN 53914, 1 g/l in distilled water at 23° C.): 28.2 mN/m In the Tables, Examples and Figures below, this product (E1) is also referred to as "E".

Synthesis of the Block Polymer (P1)

116.8 g (0.2 mol) Polypropylene glycol with average molecular weight of 600 g/mol, 58.4 g (0.6 mol) diethylene glycol and 4.4 g of potassium hydroxide, as alkoxylation catalyst, were introduced into an autoclave. After a dehydration phase followed by inertisation with nitrogen, 1236 g of propylene oxide (corresponding to 21.2 mol) were passed in continuously at 125 to 135° C. The temperature was then increased to 145 to 155° C. and 584 g of ethylene oxide (corresponding to 13.3 mol) were passed in continuously. To complete the reaction, stirring was continued for 1 hour at the same temperature. Phosphoric acid was added to the reaction product at 80 to 90° C. and water was distilled off to precipitate $K_xH_{3-x}PO4$. The neutral product was obtained after filtration with a pH of 6 to 7. (P1) contains (EO-PO-EO) triblock polymer of the general formula (Q1) and (EO-PO-EO-PO-EO) pentablock polymer of the general formula (Q2) in a ratio of 1:3.

The product (P1) had the following properties:
  Hydroxyl number (DIN 53240, phthalic anhydride method): Approx. 45 mg KOH/g
  Molecular weight (calculated based on the hydroxyl number): approx. 2500
  Viscosity (EN 12092, 23° C., Brookfield, 60 rpm): approx. 500 mPa*s
  Wetting power (EN 1772, 1 g/l in distilled water with 2 g/l soda ash at 23° C.): >300 sec
  Foam formation (EN 12728, 40° C., 2 g/l in water with 1.8 mmol $Ca^{2+}$-Ions/l, after 30 sec): 0 ml
  Surface tension (DIN 53914, 1 g/l in distilled water at 23° C.): 39.2 mN/m In the Tables, Examples and Figures below, this product (P1) is also referred to as "P".

Synthesis of the Block Polymer (P2)

EO(6)/PO(34)/EO(6)—Triblock Copolymer 600 g (1.0 mol) Polypropyleneglycol with average molecular weight of 600 g/mol, and 6 g of potassium hydroxide, as alkoxylation catalyst, were introduced into an autoclave. After a dehydration phase followed by inertisation with nitrogen, 1400 g of propylene oxide (corresponding to 24.1 mol) were passed in continuously at 125 to 135° C. The temperature was then increased to 145 to 155° C. and 500 g of ethylene oxide (corresponding to 11.4 mol) were passed in continuously. To complete the reaction, stirring was continued for 1 hour at the same temperature. Phosphoric acid was added to the reaction product at 80 to 90° C. and water was distilled off to precipitate $K_xH_{3-x}PO4$. The neutral product was obtained after filtration with a pH of 6 to 7.

The product (P2) had the following properties:
  Hydroxyl number (DIN 53240, phthalic anhydride method): Approx. 45 mg KOH/g
  Molecular weight (calculated based on the hydroxyl number): approx. 2500
  Viscosity (EN 12092, 23° C., Brookfield, 60 rpm): approx. 400 mPa*s
  Draves wetting (seconds, 25° C., 1% concentration): 10
  Foam formation (Ross Miles, 0.1% concentration, mm): 25
  Surface tension (DIN 53914, 1 g/l in distilled water at 25° C.): 42.8 mN/m Synthesis of the Alcohol Ethoxylate (L1)

i-Tridecanol (Basis: Trimeric Butene)+8EO 700 g of i-tridecanol (corresponding to 3.5 mol) together with 4.0 g of potassium hydroxide as alkoxylation catalyst were introduced into an autoclave. After a dehydration phase followed by inertisation with nitrogen, 1232 g of ethylene oxide (corresponding to 28.0 mol) were passed in continuously at 110 to 120° C. To complete the reaction, stirring was continued for 1 hour at the same temperature. The reaction product was neutralized with acetic acid at 80° C. to a pH of 6 to 7.

The product (L1) had the following properties:
  Hydroxyl number (DIN 53240, phthalic anhydride method): Approx. 95 mg KOH/g
  Molecular weight (calculated based on the hydroxyl number): approx. 590
  Viscosity (EN 12092, 23° C., Brookfield, 60 rpm): approx. 150 mPa*s Wetting power (EN 1772, 1 g/l in distilled water with 2 g/l soda ash at 23° C.): 25 sec Foam formation (EN 12728, 40° C., 2 g/l in water with 1.8 mmol $Ca^{2+}$-Ions/l, after 30 sec): 550 ml Surface tension (DIN 53914, 1 g/l in distilled water at 23° C.): 28.0 mN/m In the Tables, Examples and Figures below, this product (L1) is also referred to as "L".

Experimental Description of the Experiments with Soils:

Various water repellent soils from Western Australia, Australia, with different degrees of water repellency as indicated by differences in the MED values according to Roy and McGill (2002) were tested. In each case the 0 to 5 cm top soil was used. In Table 1 both main soil characteristics and their locations are indicated.

TABLE 1

Location and characteristics of soils (n.d. = not determined):

| Soil code | pH ($CaCl_2$) | pH ($H_2O$) | Soil texture % sand | % silt | % clay | Organic Carbon (%) | MED value | Soil location |
|---|---|---|---|---|---|---|---|---|
| S1 | 5.2 | n.d. | 85.9 | 3.2 | 10.9 | 2.9 | 2.4 | WA134 |
| S2 | 5.5 | n.d. | 93.4 | 1.0 | 5.6 | 2.0 | 4.0 | WA177 |
| S3 | 5.6 | 6.1 | 94.4 | 2.5 | 3.1 | 0.8 | 1.0-2.0 | Meckering |
| S4 | 5.4 | 6.0 | 97.5 | 0.5 | 2.0 | 1.0 | 4.0 | South Stirling |
| S5 | 5.0 | 6.0 | 86.1 | 6.4 | 7.5 | 4.9 | 2.7 | York |
| S6 | 4.6 | 5.5 | 95.7 | 1.2 | 3.1 | 0.5 | 2.0-3.0 | Strathalbyn |

Protocol (Methods for the Soil-Related Experiments):

The protocol adopted consisted of precisely packed glass columns with diameter 10 mm of target soils with particle diameters less than 420 μm and packed to a consistent density with ±0.05 variation. All soils were pre-dried at 40° C. prior to packing. Surfactants were applied to the top of the column as solutions at a rate corresponding to 2 L/ha as a banded application which translates to 17-20 L/ha in blanket application, which was then left 1 hr followed by water applied which corresponded to a 5 mm (rain event). This allowed the surfactants to infiltrate and distribute further. Soil columns were then allowed to dry at 40° C. to regain their initial weight. Water infiltration tests were then carried out at a constant hydraulic head of 5 mm. Infiltration distance and water retention (mass change) were then determined as a function of time. Finally, the hydraulic conductivity was estimated from the drainage rate at constant hydraulic head. The range of soil types were selected to cover MED values (see Roy and McGill, 2002) from 1.0 (moderately low hydrophobicity) to 4.0 (very severe hydrophobicity).

The infiltration rates measured for all soil samples were replicated in either independent duplicate or triplicate runs. The reproducibility of all data fell within the variation ±0.05 to ±0.25 cm for infiltration depths up 10 cm.

Testing: Infiltration testing comprised comparisons between (1) (N) no surfactant—water wetting, (2) P treated, (3) E treated, and (4) P-E blend, including limited L replacing P surfactant, and L-E blends. Application rates for both surfactant and surfactant blends were maintained at a constant mass basis of 2L/ha equivalent where the compositional ratio in the blend was 1:1.

Results are expressed as % reduction in infiltration time to reach a depth of 3 cm (corresponding to the seed depth) and 6 cm (corresponding to initiation of the developing rhizosphere), where % reduction is with respect to the wetting under no surfactant conditions.

Results of water holding capacity (pore filling) are expressed in terms of water holding capacity given as retained water in terms of % of the soil saturation capacity (based on pore density of the packed soil bed). Data compared are at a depth of 8 cm which is within the developing root zone, and where seed depth is 3-4 cm and which includes the reported times for infiltration i.e., 3 cm and 6 cm.

Abbreviations in Tables and Figures

| Soil code | Soil location |
|---|---|
| S1 | WA134 |
| S2 | WA177 |

-continued

| Soil code | Soil location |
|---|---|
| S3 | Meckering |
| S4 | South Stirling |
| S5 | York |
| S6 | Strathalbyn |

P=Block polymer (P1)
L=Alcohol ethoxylate (L1)
E=Alcohol alkoxylate (E1)
P-E=Composition comprising 50 wt.-% block polymer (P1) and 50 wt.-% alcohol alkoxylate (E1)
L-E=Composition comprising 50 wt.-% alcohol ethoxylate (L1) and 50 wt.-% alcohol alkoxylate (E1)
N=No Surfactant
D=Depth in cm
T=Time in seconds
MED=Molarity of Ethanol Droplet
Results on Water Repellent Soils a) Block polymer (P1)+Alcohol alkoxylate (E1):Water infiltration time

TABLE 2

| Treatment | | Reduction in time required for water to infiltrate to 30 mm depth compared to untreated soil | | |
|---|---|---|---|---|
| | | P | E | P-E |
| Soil code | MED | % reduction | % reduction | % reduction |
| S1 | 2.4 | −38.2 | −89.7 | 70.1 |
| S5 | 2.6 | 95.4 | 72.2 | 98.1 |
| S4 | 4.0 | 77.3 | 91.1 | 99.2 |
| S3 | 1.0-2.0 | 72.0 | 34.0 | 81.0 |
| S6 | 2.0-3.0 | 88.0 | 77.0 | 94.3 |

TABLE 3

| Treatment | | Reduction in time required for water to infiltrate to 60 mm depth compared to untreated soil | | |
|---|---|---|---|---|
| | | P | E | P-E |
| Soil code | MED | % reduction | % reduction | % reduction |
| S1 | 2.4 | −29.6 | −128.6 | 63.3 |
| S5 | 2.6 | 85.9 | 43.5 | 90.6 |
| S4 | 4.0 | 54.3 | 78.9 | 96.5 |
| S3 | 1.0-2.0 | 21.0 | −5.6 | 73.0 |
| S6 | 2.0-3.0 | 64.4 | 60.0 | 83.3 | b) Block polymer (P1)+Alcohol alkoxylate (E1):Water holding capacity

TABLE 4

| Surfactant Treatment | | Moisture content as a % of soil saturation capacity | | | |
|---|---|---|---|---|---|
| Soil code | MED | N | P | E | P-E |
| S4[A] | 4.0 | ~0 | 14.4 | 22.5 | 42.5 |
| S3[B] | 1.0-2.0 | 16.3 | 31.3 | 30.0 | 48.0 |

[A] After 138 s when the wetting front reaches a depth of 8 cm in the P-E pre-applied S4 soil
[B] After 274 s when the wetting front reaches a depth of 8 cm in the P-E pre-applied S3 soil c) Alcohol ethoxylate (L1)+Alcohol alkoxylate (E1):Water infiltration time

TABLE 5

| Treatment | | Reduction in time required for water to infiltrate to 30 mm depth compared to untreated soil | | |
|---|---|---|---|---|
| | | L | E | L-E |
| Soil code | MED | % reduction | % reduction | % reduction |
| S5 | 2.6 | 73.1 | 72.7 | 97.3 |
| S4 | 4.0 | 94.0 | 94.0 | 99.2 |
| S2 | 4.0 | 92.0 | 81.0 | 92.0 |

TABLE 6

| Treatment | | Reduction in time required for water to infiltrate to 60 mm depth compared to untreated soil | | |
|---|---|---|---|---|
| | | L | E | L-E |
| Soil code | MED | % reduction | % reduction | % reduction |
| S5 | 2.6 | 63.3 | 43.6 | 90.2 |
| S4 | 4.0 | 83.5 | 85.8 | 96.7 |
| S2 | 4.0 | 71.5 | 68.0 | 80.6 |

It is expected that (P2) has the same effect on the above water-holding capacity and water infiltration time as (P1).

The above experiments, especially in the Tables (Tables 1 to 6) and Figures (FIG. 1 to 8) show that the SWI could be enhanced and the SWR could be reduced by applying the tested surfactant compositions to specific soils.

Field Trial Experiments

The following field trial experiments have been conducted (results of the field trials see Table 7):

Experimental Design

| Study design | Complete Randomised Block |
|---|---|
| Replications | 5 |
| Plot length (m) | 12 |
| Plot width sprayed (m) | 1.8 |

Site Details

| Country | Australia, Western Australia |
|---|---|
| Location | Kojonup |
| Soil description | Gravelly Sand |
| Previous crop | Canola |

Crop and Sowing Details

| Crop type | Barley | |
|---|---|---|
| Variety | La Trobe | |
| Seeding rate (kg/ha) | 75 kg/ha | |
| Tillage type | Minimum tillage | |
| Cultivation | Nil | |
| Seed bed | Un-Tilled, Grazed | |
| Stubble loading | <5% | |
| Sowing equipment | Knife points and press wheels | |
| Sowing speed (km/hr) | 4.8 | |
| Sowing depth | 2 | |
| Fertiliser applied | Pre-emergent | 50 kg/ha Urea |
| | | 100 kg/ha Gusto Gold |
| | Post-emergent | 30 L/ha UAN |
| | | 40 L/ha UAN |

Further crop protection agents have been applied pre-emergent and post-emergent.

Application Details

Liquid In-Furrow

In-Furrow treatments were applied via a liquid injection system during seeding. The in-furrow injecting hose is located immediately behind the fertilizer chute on the seeding type assembly. The surface banding assembly is located immediately behind the press-wheel, with liquid treatments place at the base of the furrow. A diaphragm pump was used to propel the treatments at a pressure of 1.3 bar. All treatments were applied at 4 km/hr and a total application volume 100 L per hectare. At this speed and application volume a constant stream of liquid is achieved. The application rate of the surfactant [(P1) only] and the surfactant combination [50 wt.-% (P1) and 50 wt.-% (E1)] tested was 2 L per hectare in 100 L water per hectare.

Assessment Data Scoring Systems

Crop Establishment

The number of seedlings emerged from 5 individual 1 meter rows were counted, and converted to plants/m² based on 25.4 cm row spacing.

Crop Phytotoxicity

A visual subjective percentage (%) score was given for each plot based on any symptoms of crop phytotoxicity observed such as chlorosis, tipping and scorch, where 0=no crop phytotoxicity and 100=full crop death.

Yield

Plots were harvested with a Haldrup trial header and the weights in kg/plot recorded, then converted to t/ha using measured plot dimensions.

Results of the Field Trials

TABLE 7

Results of the field trials

| | Crop establishment (Emergence counts) in plants/m² | Crop Phytotoxicity | Yield in tons per hectare (mean value) | Standard deviation of the yield | Yield in % of the yield of untreated control |
|---|---|---|---|---|---|
| Untreated control | 92 | 0 | 5.649 | 0.366 | 100.0 |
| Treatment with surfactant (P1) only (application rate: 2 L/ha) | 109 | 0 | 5.904 | 0.781 (not significant) | 104.5 |
| Treatment with the surfactant combination comprising 50 wt.-% (P1) and 50 wt.-% (E1) (application rate: 2 L/ha) | 119 | 0 | 6.292 | 0.602 (P < 0.01 student t-distribution) | 111.4 |

Table 7 shows that in the field trials, the treatment with the surfactant combination comprising 50 wt.-% (P1) and 50 wt.-% (E1) is superior to both the untreated control and to the treatment with surfactant (P1) only.

The invention claimed is:

1. A method of enhancing soil water infiltration (SWI) and/or reducing soil water repellency (SWR) comprising:
    treating an area of groundcover with a composition (composition A) comprising
    A1) a block polymer (P) comprising
        A1.1) a (EO-PO-EO) triblock polymer of a general formula (Q1):

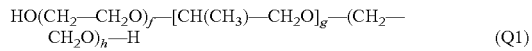   (Q1)

wherein f, g and h independently are 1 to 100 to denote a degree of polymerization and thus determine molecular weight,
        and
        A1.2) a (EO-PO-EO-PO-EO) pentablock polymer of a general formula (Q2)

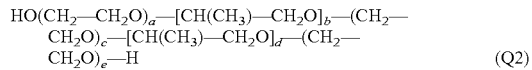   (Q2)

wherein a, b, c, d and e independently are 1 to 100 to denote a degree of polymerization and thus determine molecular weight; and
    A2) an alcohol alkoxylate (E) based on 2-propylheptanol,
        wherein a wt.-% ratio of A1) to A2) is adapted such that the SWI of the area of groundcover is enhanced or the SWR of the area of groundcover is reduced after treatment with the composition A.

2. The method according to claim 1, wherein the block polymer (P) has a surface tension of 33 to 47 mN/m at a concentration of 1 g/L in water at 23° C. as measured according to DIN 53914.

3. The A method according to claim 1, wherein the composition A comprises 40 wt.-% to 60 wt.-% of block polymer (P), or wherein the composition A comprises 40 wt.-% to 60 wt.-% of alcohol alkoxylate (E), based on the total weight of the composition A.

* * * * *